Sept. 30, 1930.    H. C. HARRISON    1,777,118
ACOUSTIC DEVICE
Filed Oct. 4, 1928

INVENTOR
HENRY C. HARRISON
BY
G H Stevenson
ATTORNEY

Patented Sept. 30, 1930

1,777,118

UNITED STATES PATENT OFFICE

HENRY C. HARRISON, OF PORT WASHINGTON, NEW YORK, ASSIGNOR TO BELL TELEPHONE LABORATORIES, INCORPORATED, OF NEW YORK, N. Y., A CORPORATION OF NEW YORK

ACOUSTIC DEVICE

Application filed October 4, 1928. Serial No. 310,361.

This invention relates to acoustical systems and particularly to acoustical wave pressure measuring devices. Its principal object is to secure improved accuracy and reliability in the measurement of sound wave pressures.

It is of interest and useful for experimental purposes to ascertain with a high degree of accuracy the wave pressure existent at points in sound conduits. This may be done by inserting into the conduit an exploring tube connected at its outer end to a detecting and indicating system, which may for example consist of a condenser-transmitter in combination with an amplifier, detector and a galvanometer. In general, however, in an arrangement of this sort there will be inaccuracies in the meter readings caused by wave reflections at the ends of the exploring tube. These wave reflections cause irregularities in the amplitude of vibration in the diaphragm of the condenser-transmitter at different frequencies and exist when neither end of the tube is terminated in an impedance equal to its characteristic impedance. In accordance with this invention the exploring tube of a wave pressure measuring instrument is provided with a special acoustical terminating device, of impedance equal to the characteristic acoustic impedance of the tube, whereby wave reflection is prevented and the irregularities and inaccuracies due thereto are eliminated.

A feature of the invention is that the terminating device comprises a combination of acoustic resistances disposed in series and in shunt with respect to the sound wave channel. This enables the resistance device to be proportioned so that it provides the proper terminal resistance for the exploring tube, and also permits the device to be designed so that it is substantially independent of the impedance of the pressure indicator.

For a pressure detecting device it is preferred to use a telephone transmitter of the electrostatic, or condenser type, although other types of telephone transmitters may also be used. The impedance of such a device is very high relative to that of the tube, and ordinarily sound waves would be reflected at this point, thus giving rise to inaccuracies of measurement. With the addition of the special terminating device of the invention the tube delivers energy to an impedance equal to its own characteristic impedance, reflection is eliminated, and irregularities at different frequencies are avoided.

By making the cross-sectional area of the exploring tube small in comparison with that of the sound conduits with which it may be used, the presence of the tube does not modify conditions in the conduit to an appreciable extent.

The following detailed description and references to the drawing will serve to clarify the invention.

Figure 1:
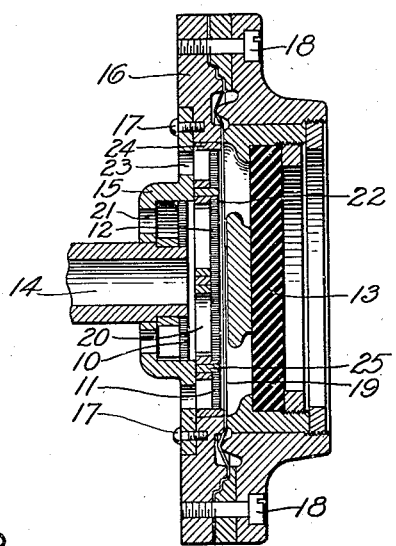
Fig. 1 illustrates a view in section of one form of the invention.

Referring to Fig. 1, the instrument comprises an electrostatic telephone receiver to the face plate 16 of which is attached a cover plate 15 into which is inserted the end of an exploring tube 14. Resistance elements 10, 11 and 12, mounted within the cover plate 15 provide the desired terminal impedance for the exploring tube, and at the same time, by their arrangement are instrumental in distributing the pressure wave over the whole area of the diaphragm 19 of the receiver. The end of the exploring tube opens into a chamber 20, of intermediate diameter. Resistance element 10, forming the rear wall of chamber 20 provides a resistive leakage path to a series of openings 21 in the plate 15, these openings being large enough to provide free communication between the resistance element and the atmosphere. Resistance 12 forms the front wall of chamber 20, and provides a path for sound waves to a second chamber 22 in front of the diaphragm. A leakage path from chamber 22 is provided by resistance 11, the path to the air being completed by a second series of holes 23 in the plate 15.

Figure 2:
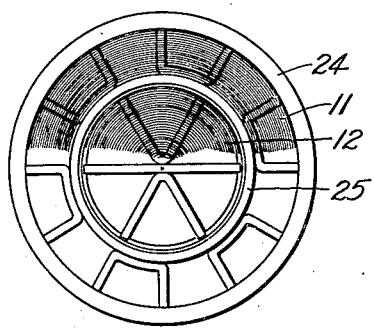
Fig. 2 shows acoustic elements forming a component part of the device.

Resistances 10, 11 and 12 are of a known type, consisting of a spirally wound ribbon of metal or other suitable material fastened edgewise to a frame, to provide a multiplicity of air passages in the form of very narrow slots. Resistance elements of this type may be constructed by winding a closely packed spiral of bi-metallic ribbon, for example copper coated with zinc, soldering the disc to a suitable frame, and thereafter dissolving out the zinc by a weak solution of hydrochloric acid. Although the acid will attack the solder to a certain degree, its action upon the solder is much slower than upon the zinc, so that the zinc will be completely dissolved before the mechanical strength of the solder is seriously impaired. The corrosion of the solder may be somewhat prevented by coating the exposed portions of the solder joints with wax before immersing in the acid. After the zinc is completely dissolved the structure should be washed to prevent further corrosion. Fig. 2 illustrates the construction of the elements 11 and 12 and the framework upon which the coiled ribbon structure is mounted. The frame consists of a pair of concentric circular rings 24 and 25, soldered to a number of radial members for supporting the flat spirals. The unit shown in Fig. 2 is mounted under the cover plate 15 and fits closely inside the opening of the receiver face plate 16. The resistance elements may be spaced away from the diaphragm by having the ring 24 project slightly in front of their surfaces, or if desired thin washers may be inserted between the ring 24 and the diaphragm. The separating ring 25 serves also as the outer wall of the intermediate air chamber 20. The member 15 is fastened to the face plate 16 by means of several machine screws 17.

Figure 3:
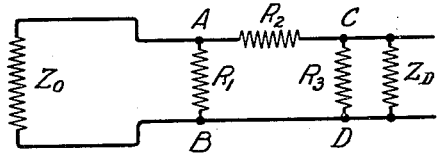
Fig. 3 is a schematic diagram showing the electrical analogue of the acoustical system in Fig. 1.

An inspection of Fig. 1 shows that sound vibrations in the exploring tube are transmitted to the air chamber 20 from which part of the energy is shunted through the resistance 10 to the atmosphere through the holes 21 in the member 15, while the rest of the energy is transmitted through the resistance element 12 to the narrow air chamber 22. From this point a small amount of energy is delivered to the diaphragm 19 while the remainder is shunted through the resistance 11 to the atmosphere through the holes 23 in the member 15. In Fig. 3 the impedances of the system of Fig. 1 are shown schematically, using the conventional symbols of an analogous electrical system. $Z_0$ represents the characteristic impedance of the exploring tube, which is the impedance measured at one end of an infinite length of the tube. $R_1$ represents the resistance 10, $R_2$ the resistance 12, $R_3$ the resistance 11, and $Z_D$ the diaphragm impedance. The resistances $R_1$, $R_2$ and $R_3$ form a network of the type known as a "pad", a property of which is that the resistance measured at the input terminals AB toward the right does not vary by more than a certain amount whether the output terminals CD are open or short-circuited. The amount of variation depends on the magnitudes of the resistances constituting the "pad". Consequently, regardless of the diaphragm impedance $Z_D$, the impedance connected to $Z_0$ can be made nearly equal to $Z_0$ at all frequencies. In practice it is generally sufficient to make the resistance $R_3$ relatively small, in which case the diaphragm impedance may be ignored.

The acoustical resistances constituting the "pad" may be evaluated by the formulæ which follow. The acoustic characteristic impedance of a tube uniform in cross-section is 41 mechanical ohms, or c. g. s. units, per square centimeter of area, which for a tube of given radius gives $$Z_0 = 41\pi a^2 \quad (1)$$

where $a$ = the radius of the tube and $Z_0$ = the acoustic characteristic impedance. The acoustic impedance is here defined as the ratio of the total wave pressure over a given cross-section of the tube to the wave velocity of the air particles at that cross-section. The resistance of an acoustic resistance element of the type described is given by $$R = \frac{12\mu l}{t^2} \cdot A \quad (2)$$

where R = the acoustic resistance, $\mu$ = the coefficient of viscosity for air, $t$ = the transverse width of the slot, $l$ = the length of the slots in the direction of motion, and A = the total cross-sectional area of the slots.

In the device of Fig. 1 the area A for any one of the elements 10, 11 or 12, is in general different from the cross-sectional area of the exploring tube; consequently there may be a restriction or an expansion of the air path from the tube to the resistance. Such contraction or expansion gives rise to a velocity transformation, and to a corresponding transformation of the resistance value as seen from the exploring tube. The impedance transformation is equal to the ratio of the squares of the cross-sectional areas of the respective portions of the path; hence the resistance of any of the elements 10, 11 or 12, as seen from the exploring tube, is given by the general formula $$R = \frac{12\mu l}{t^2 A}(\pi a^2)^2 \quad (3)$$

the values of $l$, $t$ and A being those for the respective resistance elements. The value of the viscosity coefficient, $\mu$, may be taken as $1.8 \times 10^{-4}$ c. g. s. units.

Since the diaphragm impedance may be assumed to be infinite, the terminal acoustic resistance is simply that of the combination of elements 10, 11 and 12, and is computed from the same formula as applies to the analogous electrical system. In accordance with the principle of the invention the terminal resistance should have the same value as the characteristic impedance $Z_O$ of the exploring tube. This gives $$ZO = \frac{R_1(R_2+R_3)}{R_1+R_2+R_3}, \quad (4)$$

the values of $R_1$, $R_2$ and $R_3$, being those obtained from the general formula 3. A wide choice in the individual values of $R_1$, $R_2$ and $R_3$ is permissible, and the values will generally be chosen from practical considerations. The resistance of each element may be controlled by varying the slot width $t$, its length $l$, or the total slot area, for example, by using ribbons of different widths in the construction of the elements, or by applying coatings of different thicknesses to the ribbon before coiling into its spiral form. The application of the foregoing formulæ in the carrying out of the invention will be better understood from the following calculated example.

Let it be assumed that the exploring tube has an internal diameter of 0.4 cm., and that the telephone transmitter has a diaphragm slightly greater than 2.5 cm. These dimensions are representative of instruments that have been found to be well adapted to practical use. The characteristic impedance of the tube is found by Equation (1) to be $$Z_0 = 41 \times \frac{\pi}{4} \times 0.4^2 = 5.16 \text{ c. g. s.}$$

The relative values of $R_1$, $R_2$ and $R_3$, are chosen arbitrarily, $R_3$ being kept small. Let the valves be chosen such that $R_1 = 2R_2 = 2R_3$, in which case Equation (4) gives $$R_2 = R_3 = Z_0 = 5.16 \text{ c. g. s.},$$
$$R_1 = 10.32 \text{ c. g. s.}$$

In the construction of the resistance elements suitable values for the slot dimensions are $$l = 0.25 \text{ cm.}$$
$$t = 0.002 \text{ cm.}$$

These dimensions provide sufficient data for the determination of the total slot area in each element, using Equation (3). The slot areas corresponding to $R_1$, $R_2$ and $R_3$ are respectively 0.2, 0.4 and 0.4 square centimeters. The elements 11 and 12, that is, resistances $R_3$ and $R_2$ should approximately cover the whole diaphragm, to a diameter of say 2.5 cm. This represents a total area of 4.9 cm.², which is about 6 times as great as the combined slot areas. If the resistance elements are wound with ribbon 0.006 cm. thick the winding will have a space factor of 0.25, and to obtain a total slot area of 0.8 cm.² for the two elements, a winding area of 3.2 cm.² will be required. The additional space can be taken up with the supporting framework. On this basis the central element, $R_2$, will have an outer diameter of 1.5 cm., the outer element $R_2$ will have an inside diameter of 2.0 cm., and an outside diameter of 2.5 cm. Similar calculations for the resistance $R_1$, element 10, give an outside diameter of 1.6 cm. and an inside diameter of 1.0 cm. These dimensions are well suited to the type of structure shown in Fig. 1.

In the foregoing example the resistance $R_3$ was made equal to the exploring tube impedance. In other cases where it may be desirable to make this resistance only half or quarter as great, the same design procedure would manifestly be applicable.

In certain cases it may be desirable to omit the leakage path provided by resistance $R_1$, element 10, in which case the design requirement is that $$R_2 + R_3 = Z_0.$$

Figure 5:
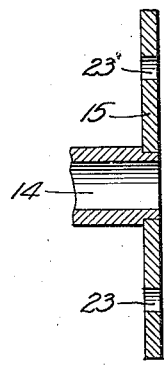
Fig. 5 illustrates a detail of a modified form of the invention.

When only two elements are used the face plate 15 may be modified as shown in Fig. 5, the holes 21 and the chamber behind them being omitted.

Figure 4:
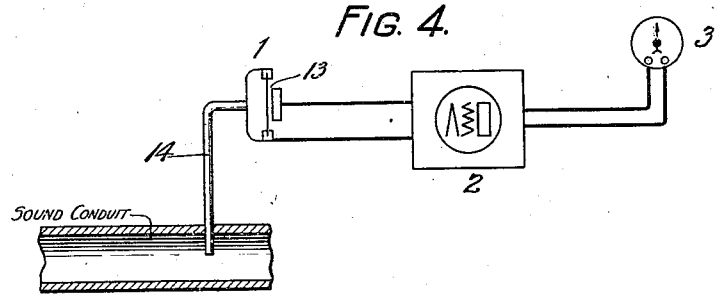
Fig. 4 shows how the invention may be used with a sound conduit to record acoustical pressures on a meter.

Fig. 4 illustrates a method of using the gauge to measure acoustical wave pressure in a sound conduit. The exploring tube 14 is inserted into the conduit through a hole in its wall and transmits a very small portion of the sound energy to the gauge 1, thereby actuating the diaphragm of the condenser-transmitted 13 by an amount which is substantially proportional to the wave pressure present in the sound conduit at the point where the exploring tube is located. Since the cross-sectional area of the exploring tube is small in comparison with that of the sound conduit, a negligible amount of wave energy is shunted to the gauge; and hence the conduit is practically unaffected by the pressure measuring device. The electrical waves generated by the condenser-transmitter are amplified in an amplifier 2 and measured by a galvanometer 3. If a detector is used with the amplifier, the meter may be a direct current instrument.

It should be understood that the invention is not limited to the use of a condenser-transmitter in the gauge. Any type of acoustical-electrical transducer could be used, but since the condenser-transmitter has the most uniform frequency-response characteristic its use is preferable. Furthermore, the type of acoustic resistance element illustrated in Fig. 2 is not essential to the proper operation of the invention, although its size and shape are found very convenient.

What is claimed is:

1. In combination in an acoustic wave pressure gauge, an exploring tube, and an acoustical resistance device at one end thereof for preventing wave reflection into said tube.

2. An acoustic pressure indicating instrument comprising in combination, an exploring tube, an acoustical-electrical transducer, and acoustical resistance elements, said resistance elements being so proportioned and arranged at the end of said exploring tube that said tube is terminated in an impedance substantially equal to its characteristic impedance.

3. An acoustic wave pressure gauge comprising in combination, an exploring tube, an acoustical-electrical transducer, and acoustical resistance elements, said resistance elements being arranged effectively in series and shunt relation between said tube and said transducer.

4. A sound wave pressure gauge comprising in combination, acoustical resistance elements, an acoustical-electrical transducer, and an exploring tube, said resistance elements being so proportioned with respect to the cross-section of said exploring tube that no appreciable wave reflections occur in the gauge.

5. The combination described in claim 1 in which the acoustical resistance device comprises a plurality of acoustical resistance units so proportioned with respect to each other and to the cross-sectional area of the exploring tube that said resistance device has a resistance equal to the characteristic impedance of said tube.

6. An acoustic wave pressure gauge in accordance with claim 2 in which the acoustical-electrical transducer is a condenser-transmitter.

7. An acoustic wave pressure gauge comprising in combination, a telephone transmitter, an exploring tube and an acoustical resistance device comprising a leakage path to the atmosphere for sound waves transmitted by said exploring tube.

8. An acoustic wave pressure gauge comprising an exploring tube and a telephone transmitter from the diaphragm of which a resistive leakage path for sound waves communicates with the atmosphere.

9. An acoustic wave pressure gauge comprising a telephone transmitter, an exploring tube the cross-sectional area of which is smaller than that of the diaphragm of said transmitter, and air chambers communicating between said tube and said diaphragm, the transverse areas of said air chambers progressively increasing toward said diaphragm, one air chamber being separated from the next by an acoustical resistance.

10. A sound wave pressure gauge comprising in combination, an exploring tube, a telephone transmitter, and three acoustical resistance elements arranged at the junction of said exploring tube and telephone transmitter in such a manner that two of said resistance elements comprise shunt paths for sound waves to the atmosphere, while the third, located effectively between the other two resistance elements in the path of wave transmission, constitutes a series path between said tube and said telephone transmitter.

11. A gauge responsive to sound pressure comprising an air chamber, an exploring tube communicating with said air chamber, two acoustical resistance elements constituting walls of said air chamber, one of said resistance elements having access to the atmosphere, a second air chamber having access to the atmosphere through a third acoustical resistance element, and a telephone transmitter the diaphragm of which constitutes a wall of said second air chamber.

12. An acoustic wave pressure gauge comprising in combination, an exploring tube, a condenser-transmitter and three acoustical resistance elements one of which constitutes a series path for sound transmission between the end of said exploring tubes and said condenser-transmitter, the other two being disposed in shunt to the path of transmission, one at each end of said series resistance, the resistances having dimensions so proportioned with respect to each other and to the cross-sectional area of said exploring tube that said tube is terminated in an acoustical resistance substantially equal to its characteristic impedance.

In witness whereof, I hereunto subscribe my name this 3rd day of October, 1928.

HENRY C. HARRISON.